United States Patent
Cary-Huanca et al.

(10) Patent No.: US 10,636,203 B2
(45) Date of Patent: Apr. 28, 2020

(54) DETERMINING DISTANCES BETWEEN REAL-WORLD ENTITIES MODELED AS GEOMETRIC SHAPES

(71) Applicant: ENTIT SOFTWARE LLC, Sanford, NC (US)

(72) Inventors: Ariel Cary-Huanca, Cambridge, MA (US); Jingjie Ni, Cambridge, MA (US)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 15/770,919

(22) PCT Filed: Oct. 30, 2015

(86) PCT No.: PCT/US2015/058279
§ 371 (c)(1),
(2) Date: Apr. 25, 2018

(87) PCT Pub. No.: WO2017/074418
PCT Pub. Date: May 4, 2017

(65) Prior Publication Data
US 2018/0315241 A1 Nov. 1, 2018

(51) Int. Cl.
*G06T 17/05* (2011.01)
*G06K 9/62* (2006.01)
*G06T 17/20* (2006.01)

(52) U.S. Cl.
CPC .......... *G06T 17/05* (2013.01); *G06K 9/6215* (2013.01); *G06T 17/20* (2013.01); *G06T 2215/16* (2013.01)

(58) Field of Classification Search
CPC .... G06F 16/7837; G06F 16/9537; G06T 7/60
See application file for complete search history.

(56) References Cited

U.S. PATENT DOCUMENTS

| 6,597,359 B1 * | 7/2003 | Lathrop ................. G06T 15/06 345/420 |
| 7,080,065 B1 * | 7/2006 | Kothuri .............. G06F 16/2264 |

(Continued)

FOREIGN PATENT DOCUMENTS

| CN | 102980581 | 3/2013 |
| JP | 2000187739 | 7/2000 |
| KR | 100965843 B1 | 6/2010 |

OTHER PUBLICATIONS http://gis.stackexchange.com/questions/3214/how-to-find-the-minimum-edge-to-edge-distance-of-polygons Author:N/A Date:N/A Title:How to Find the Minimum Edge to Edge Distance of Polygons?

(Continued)

*Primary Examiner* — Samantha (Yuehan) Wang

(57) ABSTRACT

Distances between geographic real-world entities modeled as geometric shapes are measured. At least two shapes are positioned in a coordinate space based on their respective sets of points. A non-empty quadrant set from a plurality of non-empty quadrant sets formed of non-empty quadrants in the coordinate space is identified such that the non-empty quadrants of the identified quadrant set associated with each of the at least two shapes satisfy a predetermined condition and a distance between portions of the at least two shapes in the non-empty quadrants of the identified non-empty quadrant set is an optimal value for the requested distance. The distance between the portions of the shapes in the identified quadrant set is determined to be the requested distance.

16 Claims, 6 Drawing Sheets

(56) References Cited

U.S. PATENT DOCUMENTS

| | | | | |
|---|---|---|---|---|
| 7,305,396 | B2* | 12/2007 | Schmidt | G01C 21/3638 |
| 7,953,548 | B2* | 5/2011 | Vengroff | G06F 16/9537 |
| | | | | 701/425 |
| 8,723,862 | B2 | 5/2014 | Mitani et al. | |
| 2006/0269116 | A1* | 11/2006 | Makarovic | G03F 7/70291 |
| | | | | 382/141 |
| 2013/0223748 | A1* | 8/2013 | Beck | G06K 9/4604 |
| | | | | 382/199 |
| 2014/0089333 | A1 | 3/2014 | Li et al. | |

OTHER PUBLICATIONS http://web.engr.oregonstate.edu/~nayyeria/pubs/frechet-2D.pdf Author:Nayyeri, A. et al. Date:Jul. 2, 2015 Title:Computing the Frechet Distance between Polygons with Holes.

http://www.gamasutra.com/view/feature/3317/smart_move_intelligent?print=1 Author:Bryan Stout Date:N/A Title:Smart Move: Intelligent Path-finding.

International Searching Authority; "Notification of Transmittal of the International Search Report and Written Opinion", PCT/US2015/058279, dated Jul. 29, 2016, 14 pages.

\* cited by examiner

DETERMINING DISTANCES BETWEEN REAL-WORLD ENTITIES MODELED AS GEOMETRIC SHAPES

BACKGROUND

GIS (Geographical Information Systems) software is used to create, manage and visualize geographically referenced data. Such software can be used in location determination applications, meteorological applications, geographic/geological applications and the like. The geographical entities that are dealt with are modeled as geometric figures and calculations are generated based on such geometric figures. For example, landforms such as counties, states, countries and the like can be modeled in the GIS software as areal figures such as polygons which enclose a certain area within their vertices. Some landforms can also be modeled as polygons with holes. Similarly, other geographical entities such as particular locations, rivers or geographic/political borders and the like can be modeled as non-areal geometric shapes such as points, lines or collections thereof.

BRIEF DESCRIPTION OF THE DRAWINGS

Features of the present disclosure are illustrated by way of example and not limited in the following figure(s), in which like numerals indicate like elements, and in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. In the present disclosure, the term "includes" means includes but not limited thereto, the term "including" means including but not limited thereto. The term "based on" means based at least in part on. In addition, the terms "a" and "an" are intended to denote at least one of a particular element.

Geographical boundaries like land parcels, cities or states are often modeled with 2D vector-data polygons or collections of such polygons. Many applications such as geographic applications or meteorological applications require estimating distances between real-world entities modeled as complex areal and/or non-areal structures. For example, a geographic or a demographic application may require estimating distances between counties in one region versus counties in another region. In this instance the counties in different regions can be modeled as different groups of polygons. Similarly, natural boundaries like rivers, lakes or islands can be likewise modeled as areal or non-areal geometric shapes. Many real-world scenarios require minimum or maximum distance computations among polygons.

Distance calculations between such complex groups of polygons can be a time consuming and expensive process even when executed by computing devices having powerful processors. Similarly, distance calculations for other geographic entities modeled as non-areal shapes or as areal shapes with holes can also be computationally expensive process. For example, an application may require information regarding the land parcels lying within 2 miles of a river or the distance between an archipelago and the boundary of a country. The problem of computing the minimum or maximum distance between two arbitrary geometric shapes is rather complex. The naïve approach which can be very expensive, involves distance computations for every vertex of one polygon against every edge of another polygon (and vice versa) and selecting a minimum value from the computed distances. Accordingly, various embodiments are described herein for efficiently calculating distances between various areal and non-areal geometric shapes which may be used to represent geographic entities.

Figure 1:
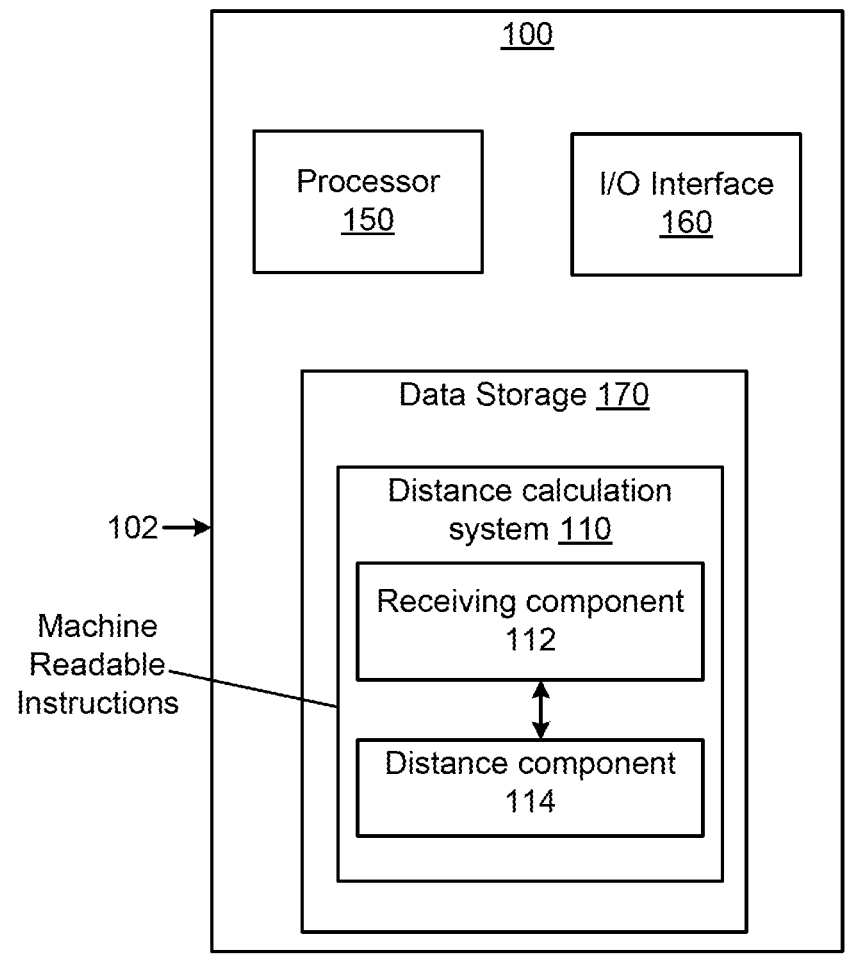
FIG. 1 shows a computer system for hosting a distance calculation system, according to an example of the present disclosure.

FIG. 1 shows a computer system 100 that can host a distance calculation system 110 that receives data regarding geographic entities or geometric shapes and calculates the distance between them. A receiving component 112 comprised in the distance calculation system 110 receives as input data 102, information regarding one or more of areal or non-areal shapes and request for distance calculations. The input data 102 and the request for distance calculations can be received from the same source or different sources. For example, a remote geographic application (not shown) can transmit a request for calculating the distance between two or more geographic entities by providing, without limitation, their common identities such as their names or their coordinates such as, latitude and longitude coordinates in WGS84 system which is commonly used in geographic applications. The receiving component 112 can be configured to access a database either within the data storage 170 or a remote database to obtain the geometric shapes for the geographic entities received from the remote geographic application. In one example, the remote geographic application can also transmit the geometric shapes corresponding to the geographic entities.

The information regarding the geometric shapes and the request is accessed by the distance component 114 for determining the requested distance. By the way of illustration and not limitation, distances between one or more of areal and non-areal shapes or distances between collections of areal shapes such as between sets of polygons can be determined. For example, one or more of a maximum distance or a minimum distance between edges of one set of polygons and another set of polygons can be determined. In one example, the distance component 114 can employ PM (polygonal map) quadtree rules to determine the distances between the shapes. In accordance with one of the PM quadtree rules, the subdivisions of a quadrant within a coordinate space can be halted if it comprises a single vertex or a single point of the shape. The distance component 114 positions the shapes in a coordinate space based on their vertices and forms sets of non-empty quadrants of the coordinate space. One of the non-empty quadrant sets that satisfies certain conditions such as the PM quadtree rules is identified such that the distance between portions of the shapes in the non-empty quadrants of the particular quadrant set forms an optimal value for the requested distance. The optimal value of the requested distance thus determined by the distance component 114 can be transmitted to the requestor via the I/O interface in one example.

The examples discussed herein present an efficient method to determine the distances between two arbitrary shapes which can include areal shapes like polygons (convex or concave), polygons with holes and non-areal shapes such as lines, points or collections thereof located in a metric space. The distance calculation system 110 works incrementally by subdividing the space occupied by the shapes into four regions and recursively searching for optimal edges (one from each polygon). When calculating the minimum distance, the distance component 114 begins by starting from the most proximal sub-regions (or quadrants), then continuing with the next most proximal quadrants and so forth. Farther away quadrants are never explored, effectively saving the computation by pruning the portions of the shapes within them. The minimum distance is continuously refined by updating it with smaller values found as the nearer edge pairs are discovered by the distance component 114. The algorithm ends when the closest quadrants are farther away compared to the current value of the minimum distance which becomes the minimum polygon distance.

A particular example of determining the minimum distance between the edges of two polygons will be detailed further infra. The polygons may be complex polygons defined by thousands of vertices. For example, a hurricane can be modeled as a complex polygon with a large number of vertices. The distance component 114 can determine the distance between the hurricane and a geographic location or landform modeled as another polygon. As time is of essence in such situations, employing powerful processors and optimizing the distance calculations as described herein can be helpful for example, in evacuation or other rescue operations.

Figure 2:
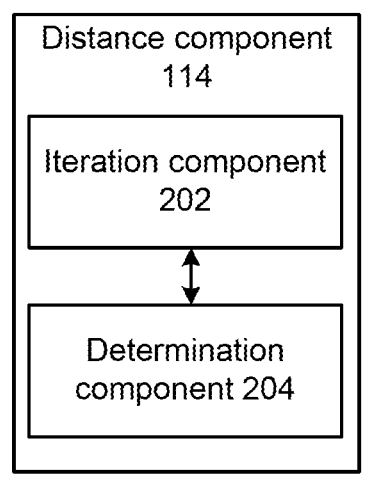
FIG. 2 illustrates a schematic figure of the distance component, according to an example of the present disclosure.

FIG. 2 illustrates a schematic figure of the distance component 114 in accordance with one example. The distance component 114 can further comprise an iteration component 202 and a determination component 204 for identifying the quadrants of a coordinate space that satisfy the conditions of the PM quadtree rules. Upon the initial placement of the shapes within the coordinate space, the iteration component initially subdivides the coordinate space into quadrants until certain conditions of PM quadtree rules are satisfied. For example, one of the conditions can require a single vertex to be present in a quadrant for halting further subdivisions of the quadrant. Moreover, the distance component 114 further estimates the distances between the quadrants to determine optimally positioned quadrants that can be further subdivided based on the request. For example, if a minimum distance between the shapes is requested, the distance component 114 can identify certain quadrants which are non-optimally positioned further apart than the others and hence are not further processed as certain portions of the shapes from other quadrants that are closer together are already known. Conversely, if a maximum distance is requested, then the non-optimally positioned quadrants which are closer together can be dropped from further processing regardless of whether or not they satisfy the PM quadtree rules.

The iteration component 202 divides the coordinate system, where the input geometric shapes are defined, into four quadrants. The determination component 204 identifies optimally located, non-empty quadrants comprising at least a portion of the shapes which satisfy a predetermined condition. If the non-empty quadrants satisfy the predetermined condition, the determination component 204 proceeds to determine the distance between the portions of the shapes in the quadrants. The quadrants that are non-optimally placed are disregarded from further processing. The quadrants that do satisfy the predetermined condition are further processed by the iteration component 202 which proceeds to subdivide such quadrant regions. Thus, the steps of the subdividing quadrant regions, the identifying optimally located, non-empty quadrants and the determining if the non-empty quadrants satisfy the predetermined condition are iteratively repeated until all the non-empty quadrants satisfy the predetermined condition. The distance between the quadrants based on minimum bounding rectangles enclosing the figures is determined and portions of the shapes within the quadrants that have the optimal distance are further identified.

Figure 3:
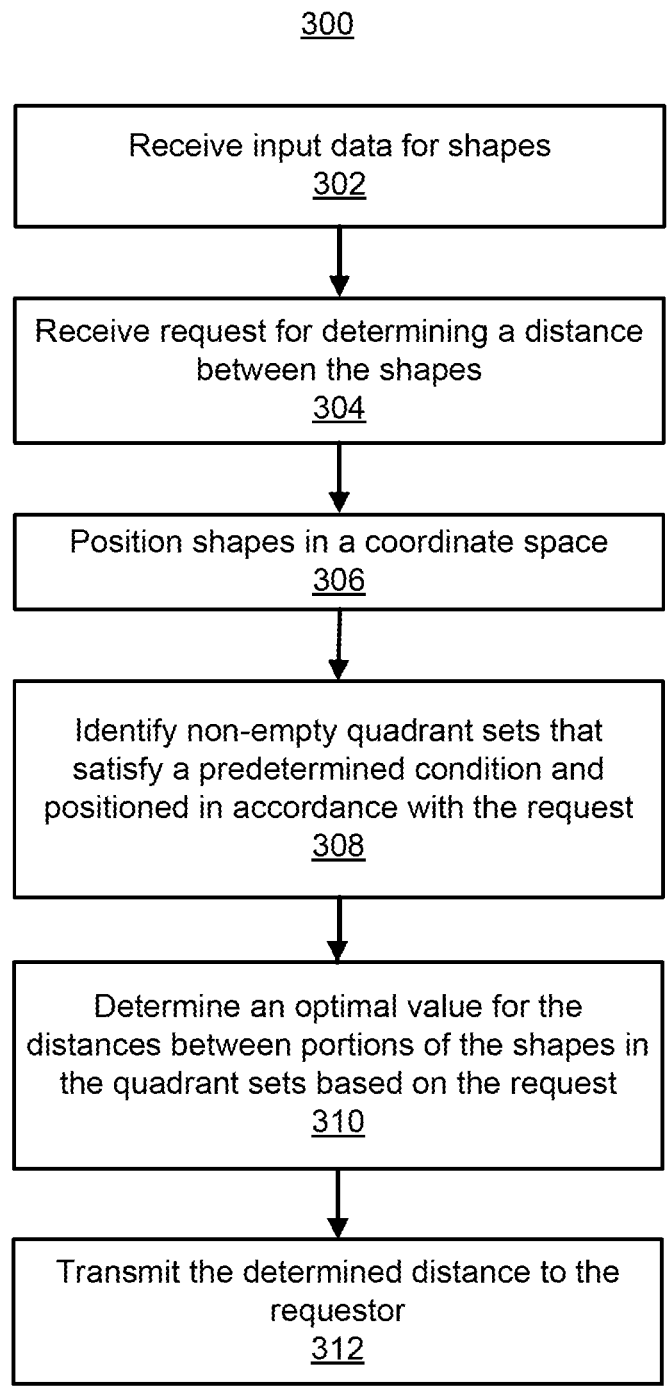
FIG. 3 shows a flowchart that details a method of obtaining the distance between two shapes, according to an example of the present disclosure.

FIG. 3 shows a flowchart 300 that details one example of a method of obtaining the distance between two shapes in accordance with one example. The method begins at 302 wherein the input data 102 regarding at least two shapes is received. The shapes can be one or more of areal or non-areal shapes which are defined by a set of points. In the case of areal shapes, the points can be vertices that define a polygon whose edges connect the vertices and enclose an area. In the case of non-areal shapes, the set of points can define curves or line segments that describe the shape.

At 304, a request to determine the distance between the shapes is received. The request can pertain to determining one or more of a minimum distance and a maximum distance between the shapes. The shapes are initially positioned in a coordinate space based on the coordinates of their respective set of points at 306. Non-empty quadrant sets in the coordinate space comprising at least a portion of each of the shapes satisfying a predetermined condition and selected in accordance with the request are identified at 308. For example, the predetermined condition can be one of the PM quadtree rules that requires that each non-empty quadrant include only one vertex of the shape. An optimal value for the distance between the portions of the shapes in the various non-quadrant sets satisfying the predetermined condition and in accordance with the request is determined at 310 and transmitted to the requestor at 312. For example, if a minimum distance between the shapes is requested, the distances between portions of the shapes in the different quadrants satisfying the predetermined condition are determined and a lowest value is selected from such distances. Conversely, if a maximum distance between the shapes is requested, the highest value is selected from the distances and transmitted to the requestor.

Figure 4:
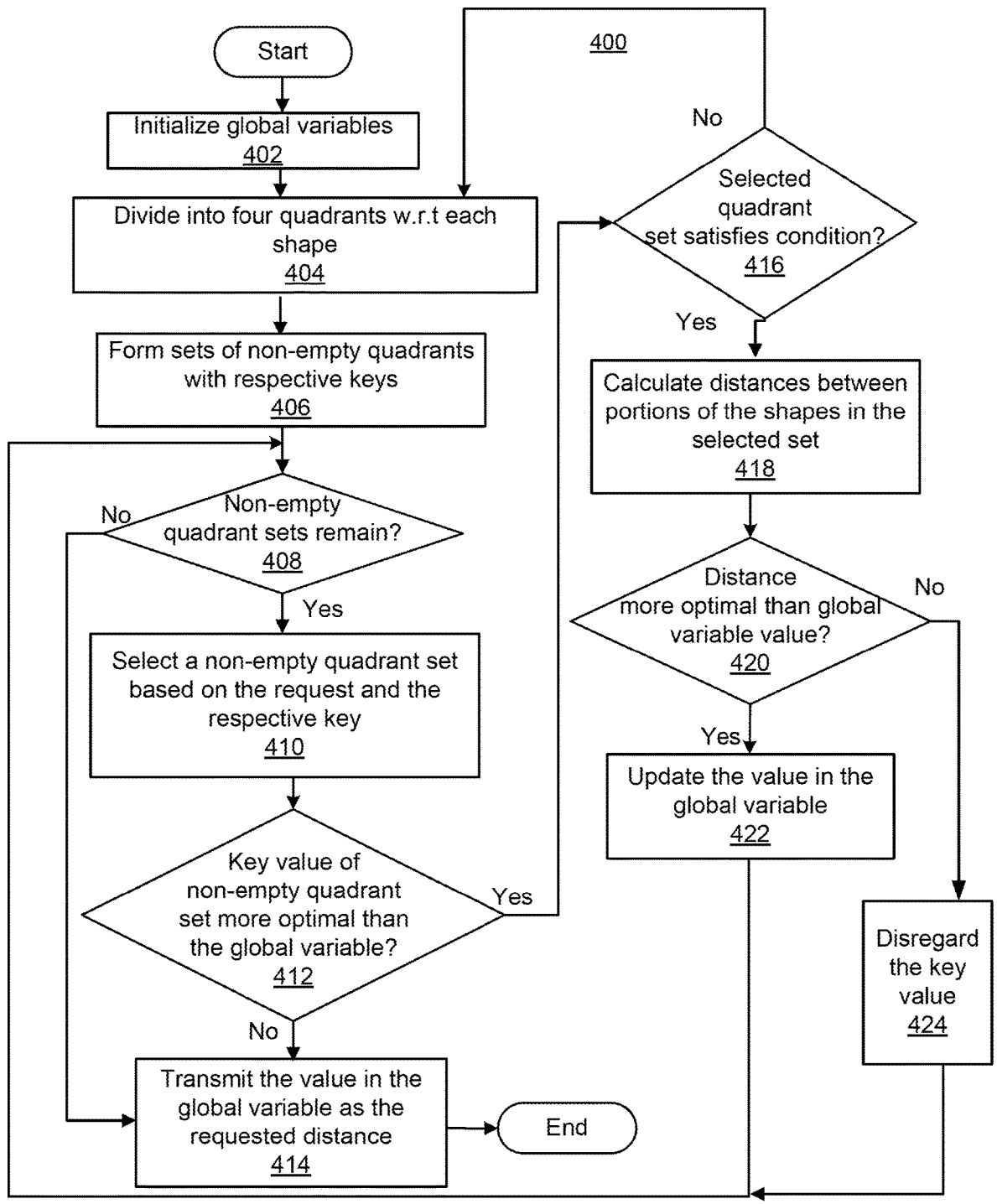
FIG. 4 is a flowchart that shows a method of identifying quadrants the meet the predetermined condition, according to an example of the present disclosure.

FIG. 4 is a flowchart 400 that shows one example of a method of identifying quadrants that meet the predetermined condition when calculating the distance between two shapes. The method begins at 402, a global variable for holding the requested distance is initialized. For example, if the minimum distance between two shapes is requested, the global variable is initialized to infinity whereas if the maximum distance between two shapes is requested, the global variable is initialized to zero. At 404 a coordinate space comprising the shapes is divided into four quadrants. At least one of the quadrants comprising the shapes is non-empty.

At 406, sets of non-empty quadrants with their respective keys can be formed. As only two polygons are being currently processed for the distance determination, each set of non-empty quadrants comprises one pair of non-empty quadrants wherein a quadrant of the pair is respectively associated with a shape in the coordinate space which is to be processed for the distance determination. The set also comprises a key value which includes the distance between portions of approximations of the shapes located in the non-empty quadrants of the set. For example, when calculating the distance between two polygons, the polygons can be approximated in terms of their minimum bounding rectangles (MBRs) and the key associated with each set of quadrants can be the distance between the portions of the MBRs in each quadrant.

At 408 it is determined if non-empty quadrant sets remain to be processed. At the commencement of the procedure, the result of the determination at 408 will be positive in that there are non-empty quadrant sets to be processed for the distance calculation. At 410, a non-empty quadrant set with an appropriate key is selected. The appropriate key is determined based on the distance that was requested. If a minimum distance between the shapes is requested, then the set of non-empty quadrants with the lowest key value is selected at 410. If a maximum distance between the shapes is requested, then the set of non-empty quadrants with the highest key value is selected at 410. Thus, from all the possible quadrants that can be explored, the optimal quadrant set is identified so that edges in the non-optimal regions are not even explored as they cannot improve upon the global variable value, thereby effectively pruning them from the processing.

At 412, it is determined if the key value of the selected non-empty quadrant set is more optimal than a global variable that is initialized at the commencement of the procedure. For example, when determining the minimum distance between the polygons, the key value is determined to be more optimal if it is less than the global variable which may be initialized to infinity at the commencement of the procedure or which may store a finite numerical value during the course of the iterations of the procedure. Conversely, when determining the maximum distance between the polygons, the key value can be determined to be more optimal if it is greater than the global variable. If it is determined at 412 that the key value is not more optimal than the value stored in the global variable, the value in the global variable is transmitted as the distance between the polygons to the requestor as shown at 414. If it is determined at 412 that the key value is more optimal than the value stored in the global variable, the method continues to determine at 416, if the selected quadrant set satisfies a predetermined condition. For example, the predetermined condition can include each quadrant of the selected quadrant set comprising at most one vertex of a polygonal shape which is one of the PM quadtree rules for terminating quadrant sub-divisions. If the selected quadrant set does not satisfy the predetermined condition, the method returns to 404 for further sub-division of quadrants in the selected non-empty quadrant set. If the selected non-empty quadrant set satisfies the predetermined condition, the distances between portions of the shapes in the selected quadrant set is calculated at 418.

At 420, it is determined if the distance between the portions of the shapes obtained at 418 is more optimal than the value currently stored in the global variable. Again, when determining the minimum distance between the polygons, the distance determined at 418 is more optimal if it is less than the global variable. Conversely, when determining the maximum distance between the polygons, the distance determined at 418 is more optimal if it is greater than the global variable. If it is determined at 420 that the distance between the shapes in the portions of the polygons is not more optimal than the global variable then the distance value is disregarded as shown at 424 and the method returns to 408 to determine if other non-empty quadrant remain to be processed. If it is determined at 420 that the distance between the portions of the shape in the selected quadrant set is more optimal than the value stored in the global variable, the global variable is updated at 422 with the distance value determined at 418 and the method again returns to 408 to determine if further non-empty quadrants remain to be processed.

Figure 5:
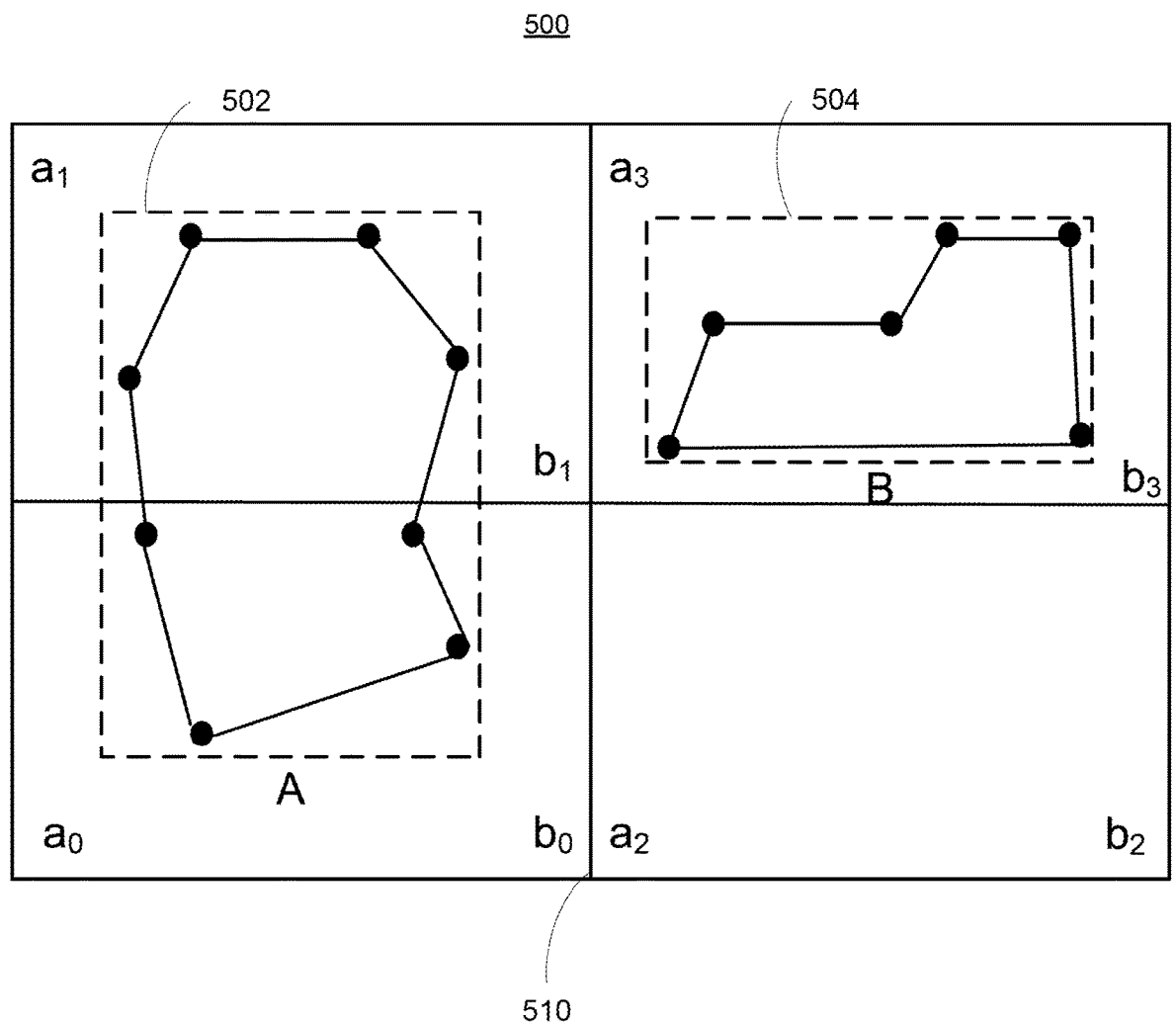
FIG. 5 shows calculation of the minimum distance between two polygons by the distance estimation system, according to examples of the present disclosure.

FIG. 5 shows one example 500 of two polygons A and B for which the minimum distance between their edges is measured by the distance calculation system 110. They are initially positioned within the coordinate system based on their vertices as shown in FIG. 5. The coordinate space 510 when divided into four quadrants with respect to each of the polygons forms $a_0$, $a_1$, $a_2$ and $a_3$ quadrants for polygon A and $b_0$, $b_1$, $b_2$ and $b_3$ quadrants for polygon B. The non-empty quadrants for polygon A are $a_0$ and $a_1$ while $b_3$ is the only non-empty quadrant for polygon B. Therefore, the quadrants $a_2$ and $a_3$ are disregarded with respect to polygon A and the quadrants $b_0$, $b_1$ and $b_2$ are disregarded with respect to polygon B.

The non-empty quadrants $a_0$, $a_1$, and $b_3$ are further processed to form sets or elements with their respective key values. In one example, the polygons A and B can be approximated to their minimum bounding rectangle (MBRs) 502 and 504. The key values can include distances of edges of the MBR 502 of polygon A in a quadrant to edges of MBR 504 of polygon B in a corresponding quadrant of the set. Accordingly, two quadrant sets can be formed from the non-empty quadrants $a_0$, $a_1$, and $b_3$ associated with the polygons A and B. In addition, a global variable for storing the minimum distance obtained at each step of the iteration can be initialized to infinity. By the way of illustration and not limitation, let the two sets or elements be $<a_1, b_3, 5>$ and $<a_0, b_3, 8>$. As the distance value '5' between the quadrants $a_1$ and $b_3$ is less than the distance value '8' between $a_0$ and $b_3$, the set $<a_1, b_3, 5>$ is stored in the min-heap data structure as the most promising pair to find the polygonal edges having a minimum distance. Conversely, if a maximum distance between the edges of the polygons A and B were being estimated, the set $<a_0, b_3, 8>$ would have been stored to the min-heap data structure.

Figure 6:
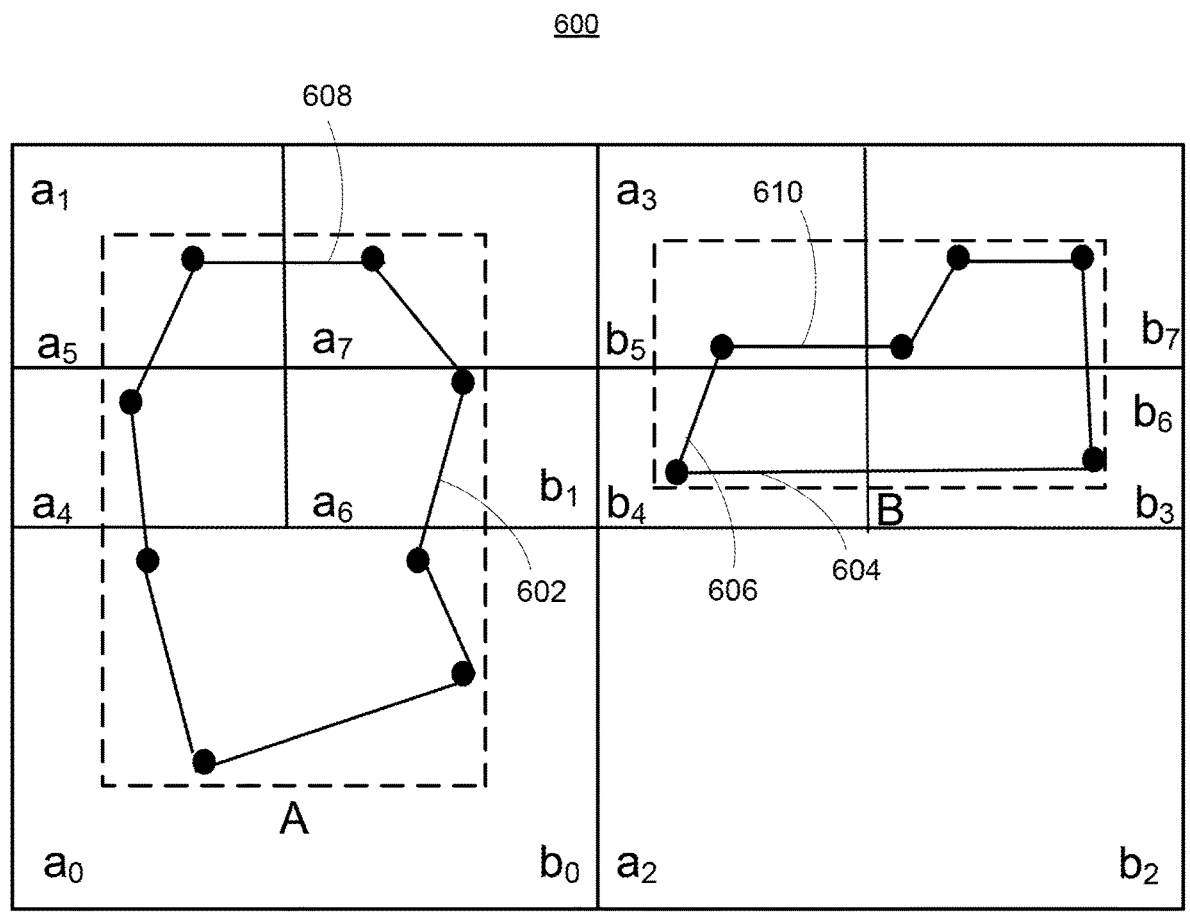
FIG. 6 shows the calculation of the minimum distance between two polygons, according to an example of the present disclosure.

FIG. 6 illustrates the quadrants $a_1$ and $b_3$ which are respectively associated with the polygons A and B upon further processing. The quadrant $a_1$ is determined as not satisfying the PM quadtree rule of comprising one vertex only. Hence, the quadrant $a_1$ is further sub-divided into quadrants $a_4$, $a_5$, $a_6$ and $a_7$. Similarly, the quadrant $b_3$ is further sub-divided into $b_4$, $b_5$, $b_6$ and $b_7$. The resulting 16 sets of quadrants formed from the correspondence between the quadrants of polygon A and polygon B can be stored in the min-heap data structure as all the quadrants $a_4$-$a_7$ and $b_4$-$b_7$ are non-empty and satisfy the predetermined condition. By the way of illustration and not limitation, let the sets of quadrants be $<a_6, b_4, 5>$, $<a_7, b_4, 6>$, $<a_7, b_5, 7>$, $<a_6, b_5, 6>$, ..., $<a_0, b_3, 8>$. Based on the distances/key values, the quadrant sets $<a_6, b_4, 5>$, $<a_6, b_5, 6>$ and $<a_7, b_4, 6>$ are determined to be the closest quadrants comprising one vertex. Therefore, they are selected for further processing. In the further processing, the distances between the actual edges of the polygons such as 602, 604, 606, 608 and 610 are measured. Any known algorithm can be used to measure the distance between the polygonal edges in the selected quadrant set as the number of edges in the quadrants are much lower than the total number of edges of the polygons A and B. Let the distance between the edges in the polygons $a_6$ and $b_4$ be 6.5 units for illustration purposes. As 6.5 units is the value obtained from the nearest quadrants $a_6$, $b_4$ (nearest quadrants being determined based on the key values which are measurements with respect to the MBRs) the global variable which was initially set to infinity is now updated to 6.5 units.

Further iterations can include selectively processing other sets from the min-heap data structure based on their key values, measuring the distances of the actual polygonal edges in the selected quadrant sets and updating the global variable if a lower value than 6.5 units is recorded at the end of the iterations. One of the reasons to consider other quadrant sets which may have higher key values than <$a_6$, $b_4$, 5> is because the key values are based on MBRs which can act as lower bounds and the distances of the actual polygonal edges may vary. Thus, further selections of quadrant sets <$a_7$, $b_4$, 6>, <$a_6$, $b_5$, 6> result in two elements having the same key value. As $a_7$ and $b_4$ both represent leaf nodes, the minimum distance between the edges in these quadrants is obtained. If the minimum distance is greater than or equal to 6.5, the global variable is not updated. If the minimum distance between the edges in the quadrants $a_7$ and $b_4$ is less than 6.5, the global variable maybe updated to the lower value. The quadrant set <$a_6$, $b_5$, 6> is similarly processed. The next quadrant set <$a_7$, $b_5$, 7> will be dropped from consideration upon the determination that its key value 7 is greater than the global variable 6.5. When the processing of the 16 quadrant sets is completed, the value in the global variable is transmitted to the requestor as the minimum distance between the polygons A and B.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims, and their equivalents, in which all terms are meant in their broadest reasonable sense unless otherwise indicated.

What is claimed is:

1. A system comprising:
   a processor; and
   a non-transitory storage medium storing instructions executable on the processor to:
      receive a request for determining a requested distance between shapes representing geographical real-world entities, and receive input data comprising a respective set of points for each of the shapes, the requested distance being one of a minimum distance and a maximum distance between the shapes;
      subdivide a coordinate space, the subdividing comprising:
         forming a plurality of non-empty quadrants, the non-empty quadrants associated with the shapes,
         in response to the plurality of non-empty quadrants not satisfying Polygonal Map quadtree rules, further subdividing the plurality of non-empty quadrants into a further plurality of non-empty quadrants,
         forming a plurality of sets of the further plurality of non-empty quadrants, and
      disregarding at least one set of the plurality of sets based on distance information associated with the at least one set of the plurality of sets;
      identify a non-empty quadrant set comprising non-empty quadrants based on the subdividing, the identified non-empty quadrant set satisfying a predetermined condition of the Polygonal Map quadtree rules, wherein identifying the non-empty quadrant set comprises excluding, from the non-empty quadrant set, empty quadrants produced by the subdividing;
      determine a distance between portions of the shapes in the non-empty quadrants of the identified non-empty quadrant set; and
      output the determined distance between the portions of the shapes in the non-empty quadrants of the identified non-empty quadrant set as the requested distance responsive to the request.

2. The system of claim 1, wherein the instructions are executable on the processor to:
   associate keys with respective sets of the plurality of sets of the further plurality of non-empty quadrants; and
   identify the non-empty quadrant set from the plurality of sets of the further plurality of non-empty quadrants based on respective minimum bounding rectangle (MBR) distances, the respective MBR distances being distances between respective MBRs enclosing the shapes.

3. The system of claim 2, wherein the instructions are executable on the processor to:
   for a particular portion of the shapes included in the identified non-empty quadrant set:
      determine distances of the particular portion to other portions of the shapes included in other non-empty quadrants of the identified non-empty quadrant set;
      record as a global variable, an optimal distance value of the distances; and
      output the optimal distance value as the requested distance responsive to the request.

4. The system of claim 1, wherein the shapes comprise a first shape and multiple other shapes, and the instructions are executable on the processor to:
   determine distances between a non-empty quadrant of the first shape and non-empty quadrants of the multiple other shapes; and
   select one of the distances as the requested distance.

5. The system of claim 1, wherein the instructions are executable on the processor to:
   determine if a given non-empty quadrant set comprising non-empty quadrants satisfies the predetermined condition; and
   in response to the given non-empty quadrant set not satisfying the predetermined condition, subdivide the non-empty quadrants of the given non-empty quadrant set into smaller quadrants.

6. The system of claim 1, wherein the shapes are one or more of areal shapes and non-areal shapes.

7. The system of claim 1, wherein the shapes comprise a first shape and a second shape that is different from the first shape.

8. The system of claim 1, wherein the instructions are executable on the processor to determine that the identified non-empty quadrant set satisfies the predetermined condition of the Polygonal Map quadtree rules responsive to determining that each non-empty quadrant in the non-empty quadrant set includes only one vertex of a respective shape of the shapes.

9. The system of claim 1, wherein the empty quadrants excluded from the non-empty quadrant set do not include any part of the shapes.

10. A method performed by a computing device, comprising:
   receiving input data of polygons respectively representing real-world entities, the input data comprising a respective set of vertices for each polygon of the polygons;
   receiving a request to compute a minimum distance between the polygons;
   positioning the polygons in a coordinate space based on the respective sets of vertices;
   forming a plurality of quadrant sets from quadrants derived from subdividing the coordinate space associated with the polygons;
   identifying a quadrant set from the plurality of quadrant sets, the identifying comprising determining that the quadrant set satisfies a predetermined condition of Polygonal Map quadtree rules based on determining that each non-empty quadrant in the quadrant set includes only one vertex of a respective polygon of the polygons, and wherein the identifying of the quadrant set comprises excluding, from the quadrant set, empty quadrants produced by the subdividing;
   determining a distance between most proximal edges of the polygons in the non-empty quadrants of the quadrant set; and
   outputting the distance of the most proximal edges as the minimum distance between the polygons.

11. The method of claim 10, wherein the polygons comprise a first polygon and other polygons, the method further comprising:
   determining distances between a non-empty quadrant of the first polygon and non-empty quadrants of the other polygons.

12. The method of claim 10, comprising:
   forming, by the computing device, the plurality of quadrant sets from quadrants satisfying the predetermined condition.

13. The method of claim 12, further comprising:
   identifying, by the computing device, a first quadrant set of the plurality of quadrant sets, wherein the quadrants in the first quadrant set have a minimum distance based on distances between respective minimum bounding rectangles (MBRs) enclosing the polygons;
   for a particular edge of the polygons included in the first quadrant set:
      determining, by the computing device, distances of the particular edge from other edges included in other quadrants of the first quadrant set; and
      recording, by the computing device, a lowest value of the distances as a global variable.

14. The method of claim 10, wherein the empty quadrants excluded from the quadrant set do not include any part of the polygons.

15. A non-transitory computer readable medium comprising instructions that upon execution cause a system to:
   receive a request for determining a requested distance between geographic entities, the requested distance being one of a maximum distance and a minimum distance between the geographic entities;
   access input data of shapes respectively modeling the geographic entities, the input data comprising a respective set of points defining each shape of the shapes in a coordinate space;
   subdivide the coordinate space, the subdividing comprising:
      forming a plurality of non-empty quadrants, the non-empty quadrants associated with the shapes,
      in response to the plurality of non-empty quadrants not satisfying Polygonal Map quadtree rules, further subdividing the plurality of non-empty quadrants into a further plurality of non-empty quadrants,
      forming a plurality of sets of the further plurality of non-empty quadrants, and
      disregarding at least one set of the plurality of sets based on distance information associated with the at least one set of the plurality of sets;
   identify a quadrant set including non-empty quadrants based on the subdividing, the identified quadrant set satisfying a predetermined condition of the Polygonal Map quadtree rules, wherein the identifying of the quadrant set comprises excluding, from the quadrant set, empty quadrants produced by the subdividing;
   determine a distance between portions of the shapes included in the non-empty quadrants of the identified quadrant set; and
   output, as the requested distance, the distance between the portions of the shapes in the non-empty quadrants of the identified quadrant set.

16. The non-transitory computer readable medium of claim 15, wherein the empty quadrants excluded from the quadrant set do not include any part of the shapes.

* * * * *